(12) United States Patent
Kim

(10) Patent No.: US 8,391,787 B2
(45) Date of Patent: Mar. 5, 2013

(54) MOBILE TERMINAL AND METHOD FOR DISPLAYING WIRELESS DEVICES THEREOF

(75) Inventor: Min-Sup Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 12/164,482

(22) Filed: Jun. 30, 2008

(65) Prior Publication Data

US 2009/0156123 A1 Jun. 18, 2009

(30) Foreign Application Priority Data

Dec. 18, 2007 (KR) ........................ 10-2007-0133722

(51) Int. Cl.
*H04B 7/00* (2006.01)
*H04W 24/00* (2009.01)

(52) U.S. Cl. .................... 455/41.2; 455/41.1; 455/41.3; 455/457; 455/566

(58) Field of Classification Search ................ 455/41.1, 455/41.2, 41.3, 457, 566
See application file for complete search history.

(56) References Cited

U.S. PATENT DOCUMENTS

| | | | | |
|---|---|---|---|---|
| 7,231,209 | B2 * | 6/2007 | Blom et al. .................... | 455/420 |
| 7,747,223 | B2 * | 6/2010 | Wilson et al. ................. | 455/41.2 |
| 2002/0090912 | A1 | 7/2002 | Cannon et al. .................. | 455/41 |
| 2002/0160817 | A1 * | 10/2002 | Salmimaa et al. ............ | 455/566 |
| 2005/0266798 | A1 * | 12/2005 | Moloney et al. ............. | 455/41.2 |
| 2006/0058013 | A1 | 3/2006 | Bocking et al. | |
| 2006/0135204 | A1 | 6/2006 | Angelhag | |
| 2006/0281477 | A1 * | 12/2006 | Downes ........................ | 455/509 |
| 2007/0202808 | A1 * | 8/2007 | Kim ............................. | 455/41.2 |
| 2007/0259674 | A1 * | 11/2007 | Neef et al. ................. | 455/456.1 |
| 2008/0043110 | A1 * | 2/2008 | Aizawa ....................... | 348/211.2 |
| 2008/0057890 | A1 * | 3/2008 | McKillop et al. .......... | 455/185.1 |
| 2008/0085740 | A1 * | 4/2008 | Lee ............................... | 455/566 |
| 2008/0242365 | A1 * | 10/2008 | Rokusek et al. ............ | 455/569.1 |
| 2009/0174525 | A1 * | 7/2009 | Yamauchi ..................... | 340/5.8 |
| 2010/0255778 | A1 * | 10/2010 | Lovell et al. ................. | 455/41.2 |

FOREIGN PATENT DOCUMENTS

| | | |
|---|---|---|
| CN | 1591560 | 3/2005 |
| CN | 1745543 | 3/2006 |
| CN | 1848871 | 10/2006 |

OTHER PUBLICATIONS

A specification of Nokia 5300.
A screen-capture of website "product.cnmo.com/cell_phone/index91419.shtml5300".
A screen-capture of website "tech.sina.com/mobile/4290/detail.shtml".
A screen-capture of website "detail.zol.com.cn92/91419/param.shtml".

* cited by examiner

Primary Examiner — Wen Huang
(74) Attorney, Agent, or Firm — Lee, Hong, Degerman, Kang & Waimey

(57) ABSTRACT

A mobile terminal includes a wireless communication unit for searching for wireless devices for pairing with the mobile terminal, a controller for determining a priority of each of the searched wireless devices according to a specific condition, and a display unit for displaying the searched wireless devices, wherein each searched wireless device is particularly displayed on a display region with respect to the other searched wireless devices according to its determined priority.

12 Claims, 14 Drawing Sheets

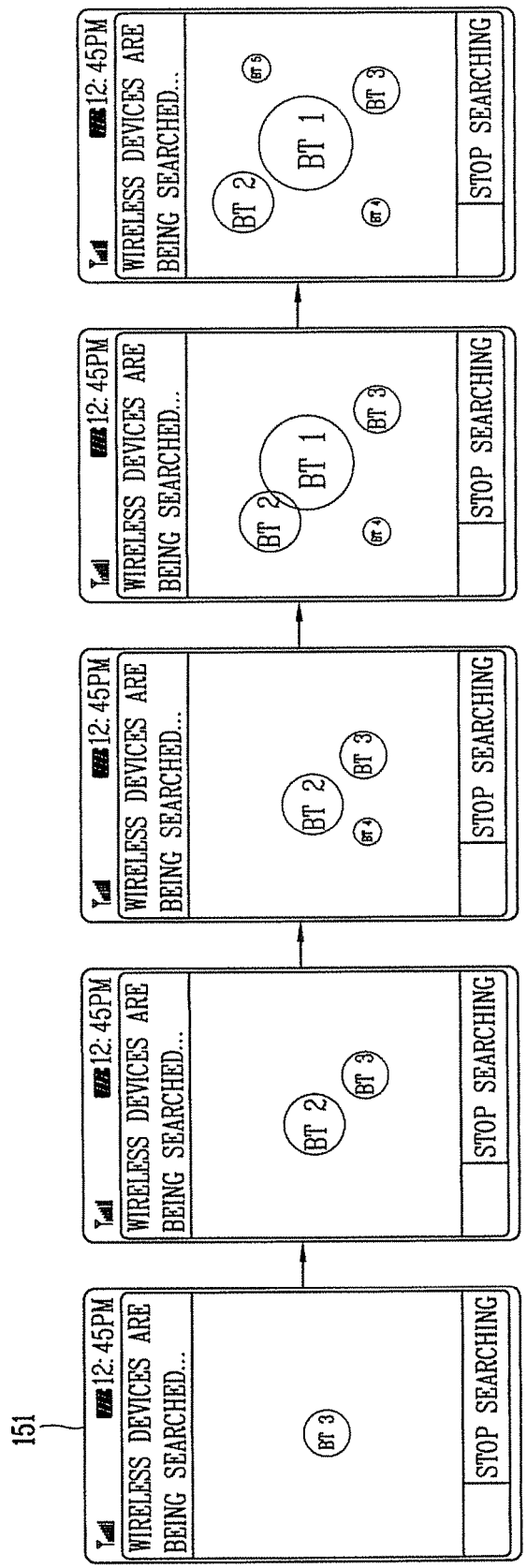

MOBILE TERMINAL AND METHOD FOR DISPLAYING WIRELESS DEVICES THEREOF

CROSS-REFERENCE TO RELATED APPLICATIONS

Pursuant to 35 U.S.C. §119(a), this application claims the benefit of earlier filing date and right of priority to Korean Application No. 10-2007-0133722, filed on Dec. 18, 2007, the contents of which are hereby incorporated by reference herein in their entirety.

FIELD OF THE INVENTION

The present invention relates to a mobile terminal implementing a method for displaying short-range wireless devices searched for pairing with the mobile terminal.

DESCRIPTION OF THE BACKGROUND ART

A mobile terminal may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, some mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. Accordingly, folder types, slide types, bar types, or rotation types of mobile terminals are being presented.

In the conventional mobile terminal, when wired devices are searched by the mobile terminal for paring, searched wireless devices are displayed in a searched order. Accordingly, when a plurality of wireless devices are displayed on a list, it may be difficult for a user to pair the desired wireless devices with the mobile terminal.

SUMMARY OF THE INVENTION

Therefore, it is an object of the present invention to provide a method for pairing a mobile terminal with wireless devices by displaying searched wireless devices according to a preset priority option. It is another object of the present invention to provide a method for pairing a mobile terminal with wireless devices by displaying searched wireless devices according to a preset option.

It is still another object of the present invention to provide a method for pairing a mobile terminal with wireless devices by displaying only wireless devices that can perform specific services designated by a user. It is yet still another object of the present invention to provide a method for periodically checking whether wireless devices paired with the mobile terminal are accessible, and real time display of accessibility of the wireless devices.

To achieve these and other advantages and in accordance with the purpose of the present invention, as embodied and described herein, there is provided a mobile terminal including a wireless communication unit for searching for wireless devices for pairing with the mobile terminal, a controller for determining a priority of each of the searched wireless devices according to a specific condition, and a display unit for displaying the searched wireless devices. Each searched wireless device is particularly displayed on a display region with respect to the other searched wireless devices according to its determined priority.

Preferably, the controller displays a searched wireless device having a higher priority above a searched wireless device having a lower priority on the display region. Alternatively, the controller displays a searched wireless device having a higher priority closer to a center of the display region relative to a searched wireless device having a lower priority. Alternatively, the controller displays a searched wireless device having a higher priority with a larger size on the display region relative to a searched wireless device having a lower priority.

In one aspect of the present invention, the controller displays the searched wireless devices using names of the wireless devices and/or a specific image for each kind of wireless device. The specific condition for determining the priority includes device number of pairing frequencies, alphabetical device name order, recent access to device, device access time, device signal reception sensitivity, device range, device type, and service capability of device.

In one aspect of the present invention, the controller registers at least one wireless device selected from the searched wireless devices displayed, wherein the at least one wireless device is selected according to a touch or button input manner. Preferably, the controller periodically inquires about the registered wireless devices and displays the inquired wireless devices, classifying each of the inquired wireless devices as accessible or inaccessible according to whether each of the inquired wireless devices responded to the inquiries. In another aspect of the present invention, the controller connects the mobile terminal to at least one wireless device displayed when the at least one wireless device is selected according to a touch or button input manner.

According to an embodiment of the present invention, a method of searching and pairing wireless devices with a mobile terminal includes searching for wireless devices for pairing with the mobile terminal, determining a priority of each of the searched wireless devices according to a specific condition, and displaying the searched wireless devices on a display region according to determined priorities.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 7A to 7C are views of a screen showing a wireless device search list in a mobile terminal according to an embodiment of the present invention.

DETAILED DESCRIPTION OF PREFERRED EMBODIMENT

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The mobile terminal according to the present invention will now be described. The mobile terminal may be implemented in various forms. Examples of such mobile terminals include mobile phones, user equipments, smart phones, computers, digital broadcast terminals, personal digital assistants, portable multimedia players (PMP) and navigators.

Figure 1:
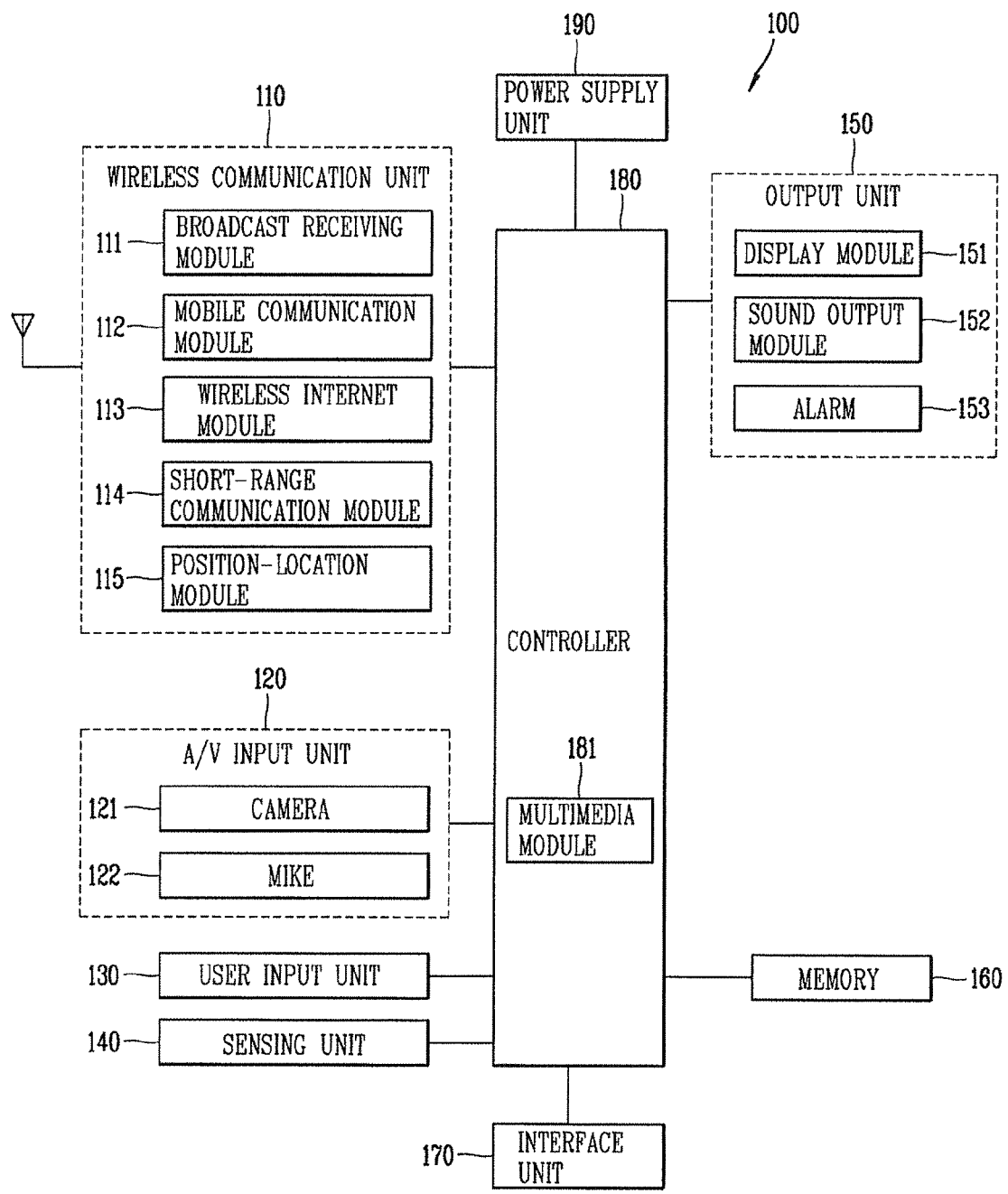
FIG. 1 is a block diagram of a mobile terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) or an electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH® and Zigbee®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video. The microphone 122 receives an external audio signal while the portable device is in a particular mode, such as phone call mode, recording mode or voice recognition mode. This audio signal is processed and converted into digital data.

The mobile terminal 100 and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones 122 and/or cameras 121 may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is a user input unit 130 configured as a touchpad in cooperation with a touch screen display, which will be described in more detail below.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or the orientation or acceleration/deceleration of the mobile terminal.

The sensing unit 140 may sense whether a sliding portion of the mobile terminal 100 is open or closed if the mobile terminal is configured as a slide-type mobile terminal. The sensing unit 140 may also sense the presence or absence of power provided by the power supply 190, and the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures. The interface unit 170 may be configured using a wired/wireless data port, audio input/output ports, video input/output ports, or a card socket for coupling to a memory card, a subscriber identity module (SIM) card, a user identity module (UIM) card, or a removable user identity module (RUIM) card).

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of the output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
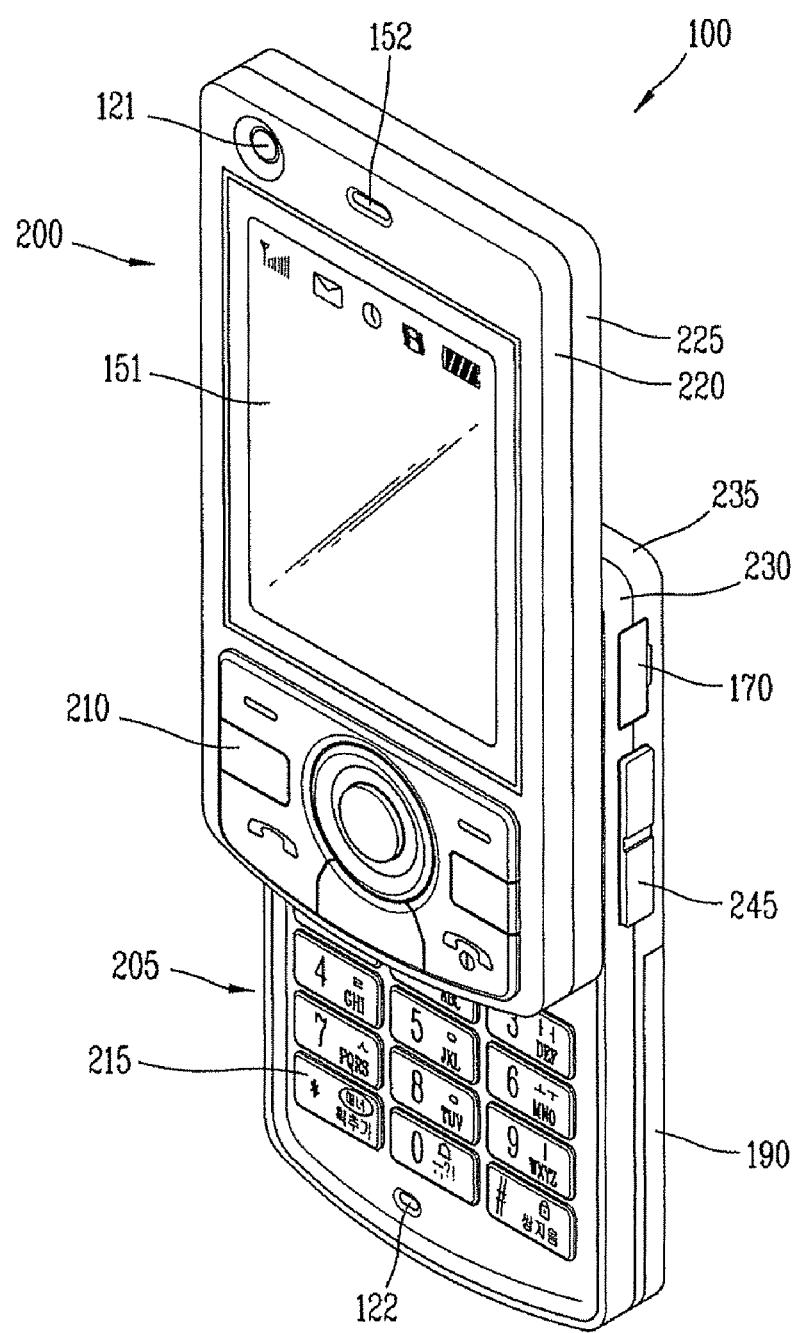
FIG. 2 is a perspective view of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The first cases 220, 230 and second cases 205, 235 are usually formed of a suitably rigid material, such as injection molded plastic, or formed using metallic material, such as stainless steel (STS) or titanium (Ti).

One or more intermediate cases may be provided between the first case 225 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit 130, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
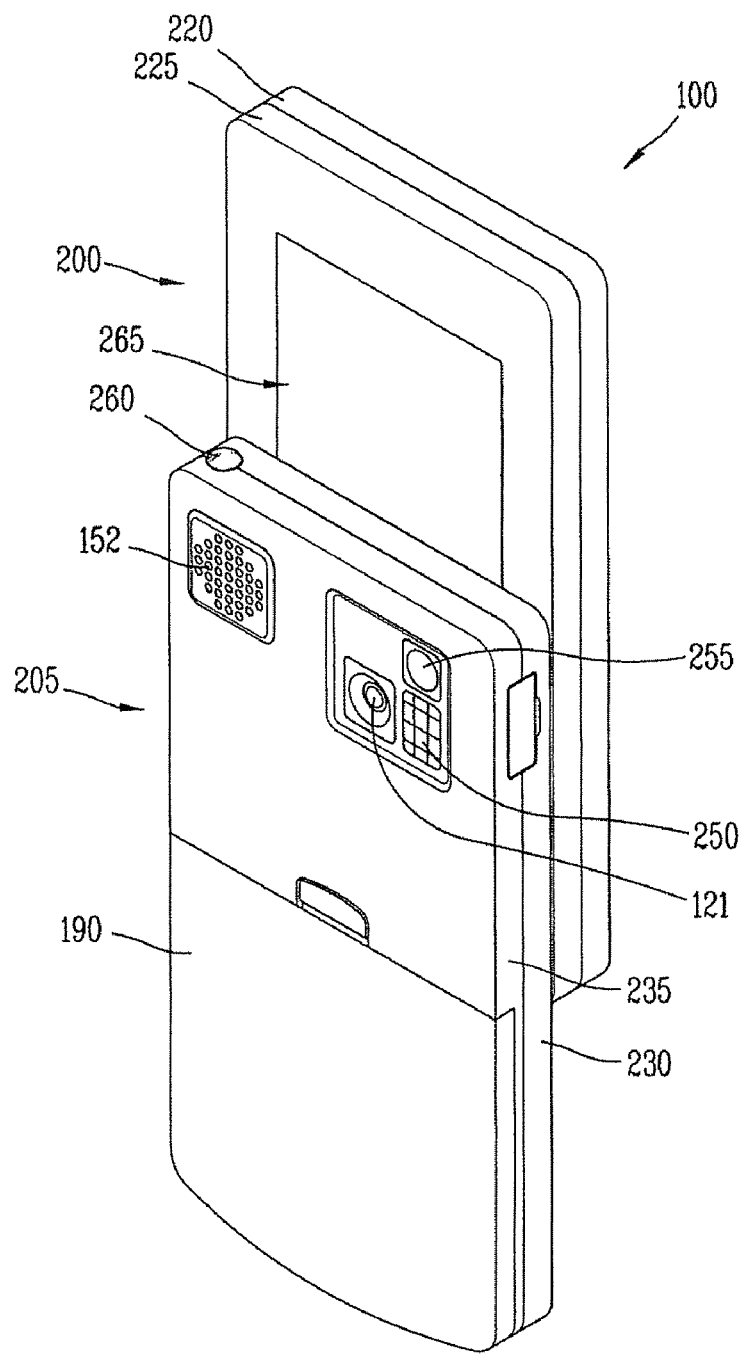
FIG. 3 is a rear view of the mobile terminal shown in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may be implemented in the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
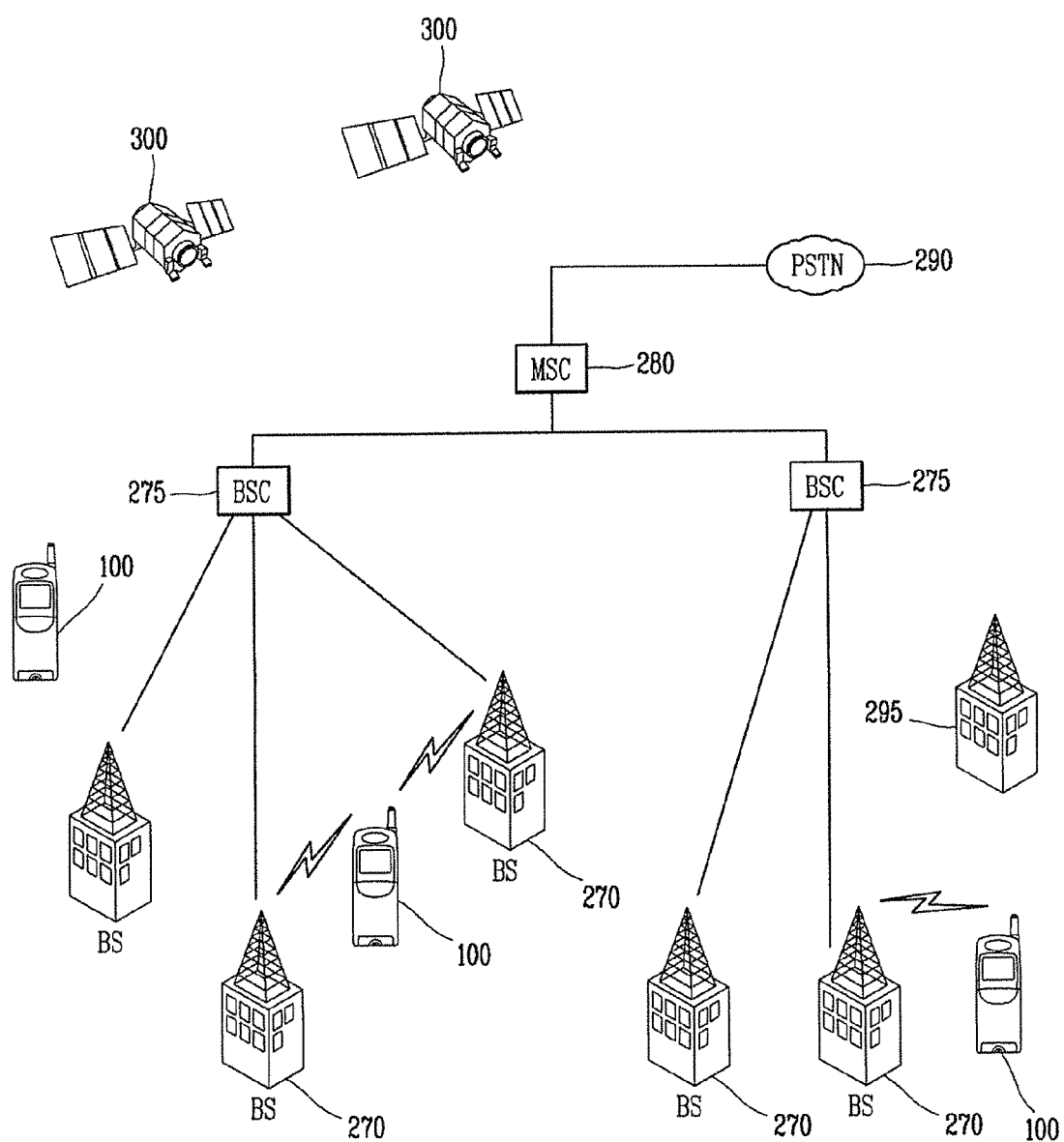
FIG. 4 is a block diagram of a CDMA wireless communication system operable with the mobile terminal of FIGS. 1-3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

In the present application, wireless devices may include short-range communication module 114 that can be directly connected to a mobile terminal 100 on one to one basis without a repeater and wireless communication devices that can be connected to the mobile terminal through a repeater. A method for displaying searched wireless devices on the mobile terminal 100 according to an embodiment of the present invention is described hereafter.

Figure 5:
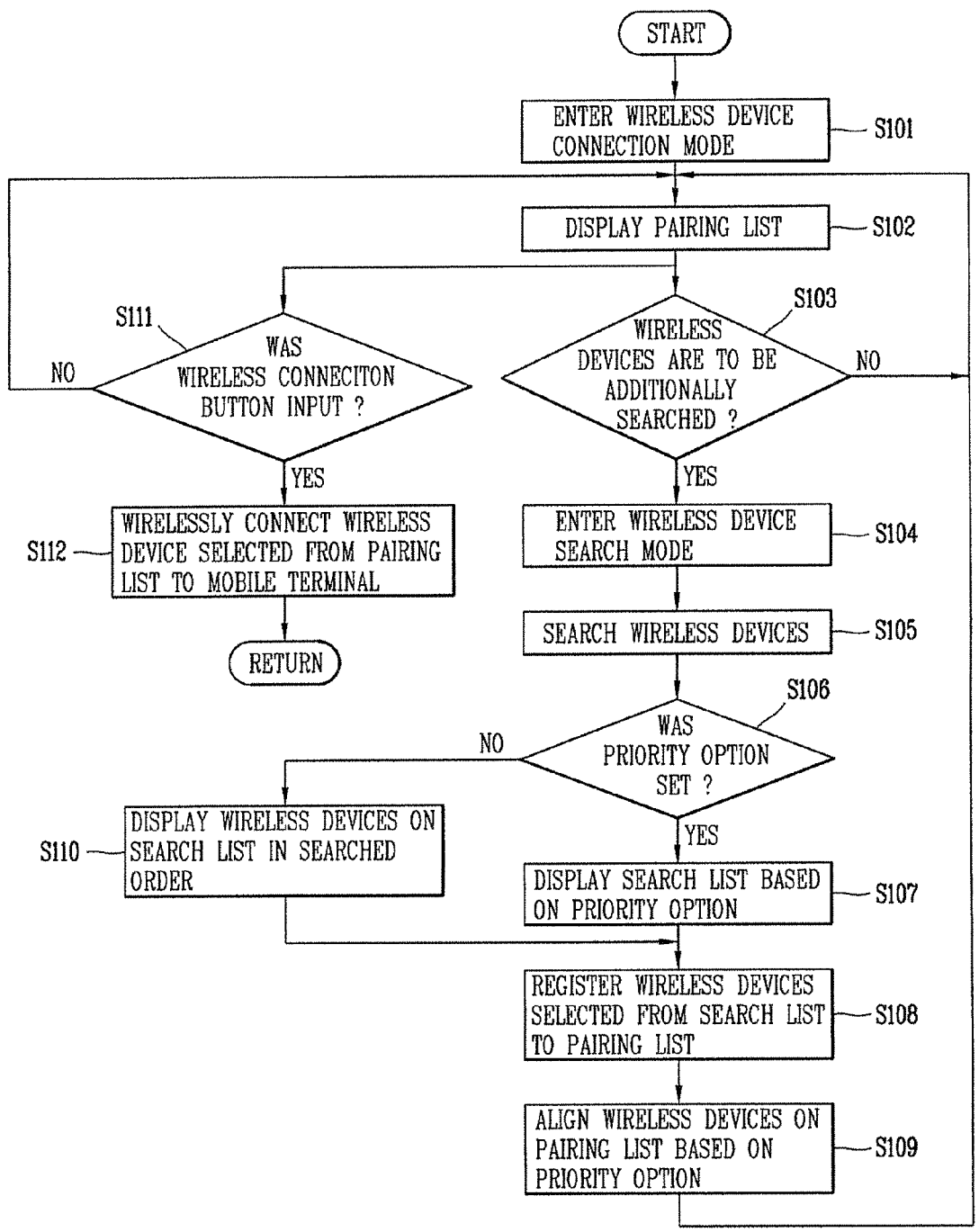
FIG. 5 is a flowchart showing a method for searching and displaying wireless devices for pairing in a mobile terminal according to an embodiment of the present invention.

Referring to FIG. 5, in response to a user's manipulation of a specific menu to wirelessly connect the mobile terminal 100 to peripheral wireless devices, a controller 180 allows the mobile terminal to enter a wireless device connection mode (S101). When the mobile terminal 100 enters a wireless device connection mode, the controller 180 displays a pairing list (S102).

The pairing list indicates registration information of wireless devices capable of being connected to the mobile terminal 100. For pairing between the wireless device and the mobile terminal 100, the mobile terminal to be connected to wireless devices must receive a specific pin code or password for each wireless device to be connected for security. The pin code or password must be received each time the wireless devises are connected to the mobile terminal 100. In order to solve this inconvenience, each pin code or password for the wireless devices to be connected to the mobile terminal 100 may be registered in the pairing list in advance. Accordingly, the mobile terminal 100 is automatically connected to the wireless devices registered in the pairing list.

When a specific wireless device is selected from the pairing list and then a button or touch is input for connection (S111), the controller 180 wirelessly connects the selected wireless device to the mobile terminal 100 (S112). However, when a wireless device has not been registered in the pairing list, or when a wireless device is to be registered, the controller 180 searches a new wireless device by entering a wireless device search mode (S103 YES, S104). The controller 180 may search wireless devices in response to a user's menu or key manipulation (S105).

If there are responding wireless devices at the time of searching wireless devices, a list of the wireless devices or a 'search list' is displayed on a screen. In the search list, the wireless devices are displayed in the order of responses received from the wireless devices, and thus, a wireless device that responded first is displayed at a particular position in the list, for example, at the upper position in the search list (S110). However, if there are many wireless devices displayed in the search list, a user may have difficulty in selecting a wireless device to which the mobile terminal 100 will be connected.

In the present invention, at the time of searching or displaying the list of the wireless devices, a wireless device having a higher priority may be displayed on an upper position in the search list according to a priority option preset by the user. Accordingly, the wireless device desired by the user can be easily selected to be connected with the mobile terminal 100.

Since the priority option for searching or displaying wireless devices is preset, when a menu for searching wireless devices is input via a button or touch screen, the controller 180 refers to the set priority option (S106). Then, wireless devices are searched or displayed based on the priority option (S107). The specific priority option may be set by the user or set as a default by a manufacturer.

The controller 180 registers a wireless device selected from the search list to a pairing list (S108). According to the user's menu or key manipulation, the search list and pairing list may be toggled to each other to be displayed. That is, the user may select a plurality of wireless devices from the search list and register them to the pairing list. If there are wireless devices to be additionally registered to the pairing list, the wireless devices may be additionally selected from the previous search list without performing the search again.

The search list or pairing list may be sequentially displayed based on the priority option by using names of the wireless devices. Also, the search list or pairing list may be displayed by using specific images that represent each kind of wireless devices in the order of their sizes. The controller 180 may display pairing lists by aligning them according to the preset priority option (S109).

The priority option for displaying the search list or pairing list may include an option for a wireless device having a plurality of pairing frequencies, a wireless device having a priority according to an alphabetical order of its name, a wireless device which has been recently accessed, a wireless device having a long access time, a wireless device having a high reception sensitivity for signals, a short-range wireless device, a specific kind of wireless device, a wireless device that can perform a specific service, and the like.

The priority option may be used a plurality of times. For example, a wireless device having the plurality of pairing frequencies may be displayed at an upper position in the list, or the wireless device having a priority according to the alphabetical order of its name, or the wireless device having been recently accessed, or the wireless device having a long access time, or the wireless device having a high reception sensitivity for signals, or the short-range wireless device may be displayed on an upper position of the list.

Further, the controller 180 may further display in real time whether each wireless device is accessible in the pairing list. For example, the controller 180 may check whether a paired wireless device is accessible within a short time by receiving a response to a simple request message, and then displays whether the paired wireless device is accessible in the pairing list. That is, if an accessibility indicator for a specific wireless device is in the ON state, the specific wireless device is accessible in real time.

Figure 6:
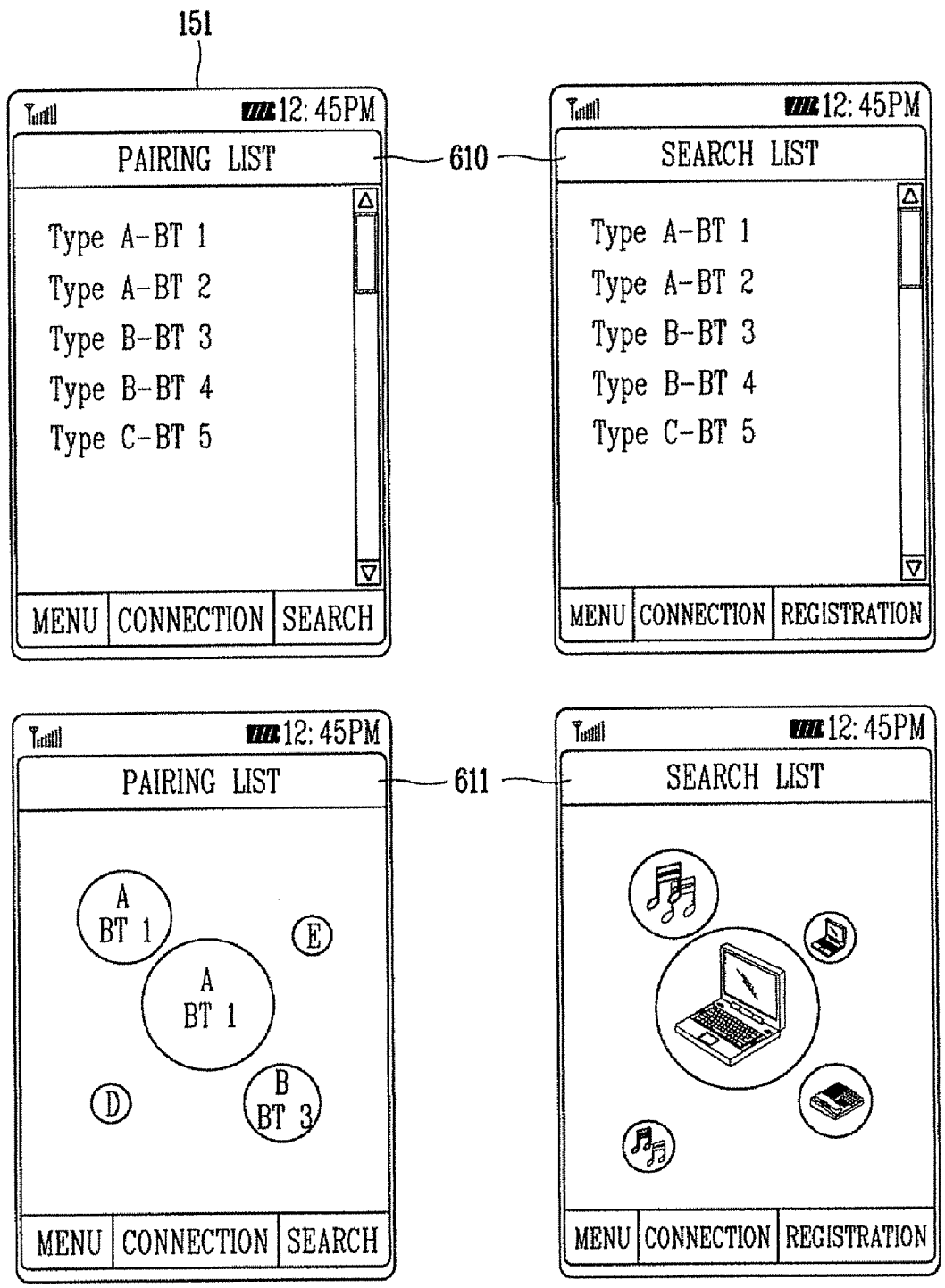
FIG. 6 is a view of a screen showing a wireless device connection mode in a mobile terminal according to an embodiment of the present invention.

Hereinafter, the operation for searching and displaying wireless devices by the mobile terminal 100 will be explained. Referring to FIG. 6, in the wireless device connection mode, previously paired wireless devices are displayed in the pairing list. Wireless devices may be displayed in the pairing list by their names (610) or as specific images that represent their types (611). The specific images are displayed as images that represent features of wireless devices according to the type of the wireless device, for example, as icons. The specific images serve to allow the user to immediately recognize the type of the wireless device as a headset, a PC, or other kinds of wireless devices.

Wireless devices may be displayed in the list according to a preset priority option. The types, orders, positions, sizes, distances, colors, or brightness of the wireless devices may be distinctly displayed according to the priority option.

The priority option may be applied a plurality of times. For instance, the priority option may be applied to a wireless device having a plurality of pairing frequencies, a wireless device having a priority according to the alphabetical order of its name, a wireless device having been recently accessed, a wireless device having a high reception sensitivity for signals, a short-range wireless device, a specific kind of wireless device, a wireless device that can perform a specific service, and the like. The priority option for searching or displaying the wireless devices may be applied to display not only the pairing list, but also the search list.

A user may select a desired wireless device from the pairing list, and connect the mobile terminal 100 to the selected wireless device. However, if there is no wireless device to which the mobile terminal 100 is to be connected, a current mode is converted to a wireless device search mode.

The controller 180 may not search the wireless device that is already registered to the pairing list, and the registered wireless device is not displayed in the search list. It is preferable that the controller 180 does not search wireless devices that are already registered to shorten the searching time.

If responding wireless devices are found during the search, the controller 180 displays a search list including the found wireless devices on a screen. The search list may be displayed in the order searched, but not based on the priority option. Alternatively, the search list may be displayed based on the priority option, as in the pairing list.

Figure 7A:
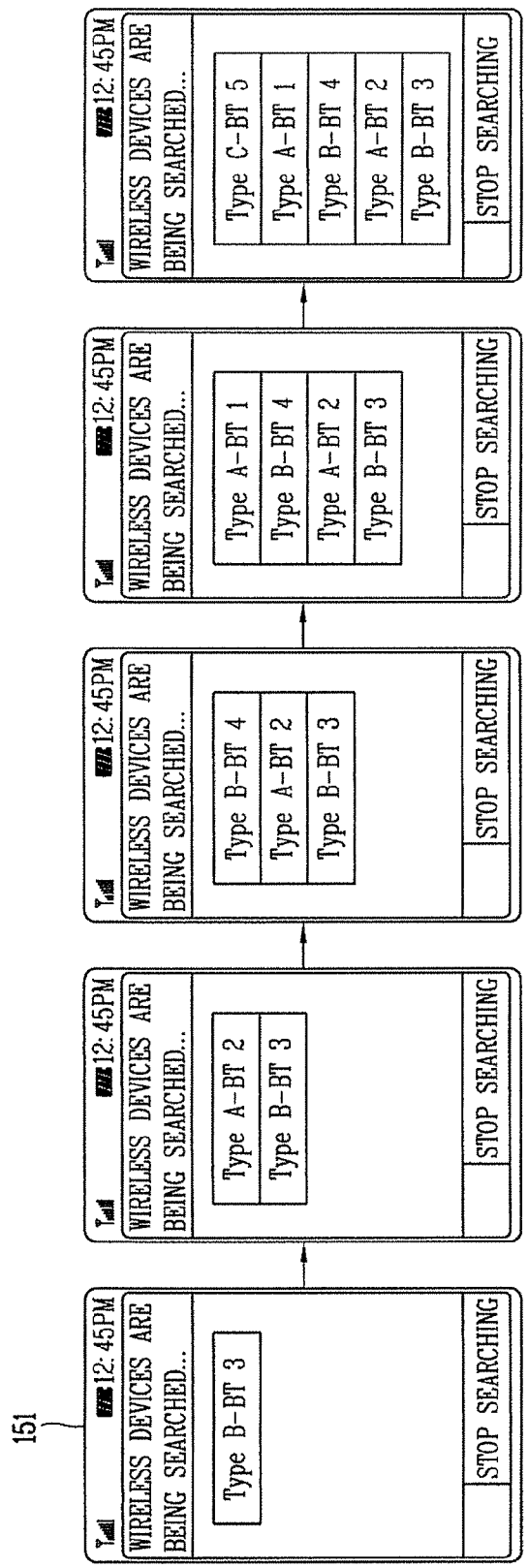
Figure 7B:
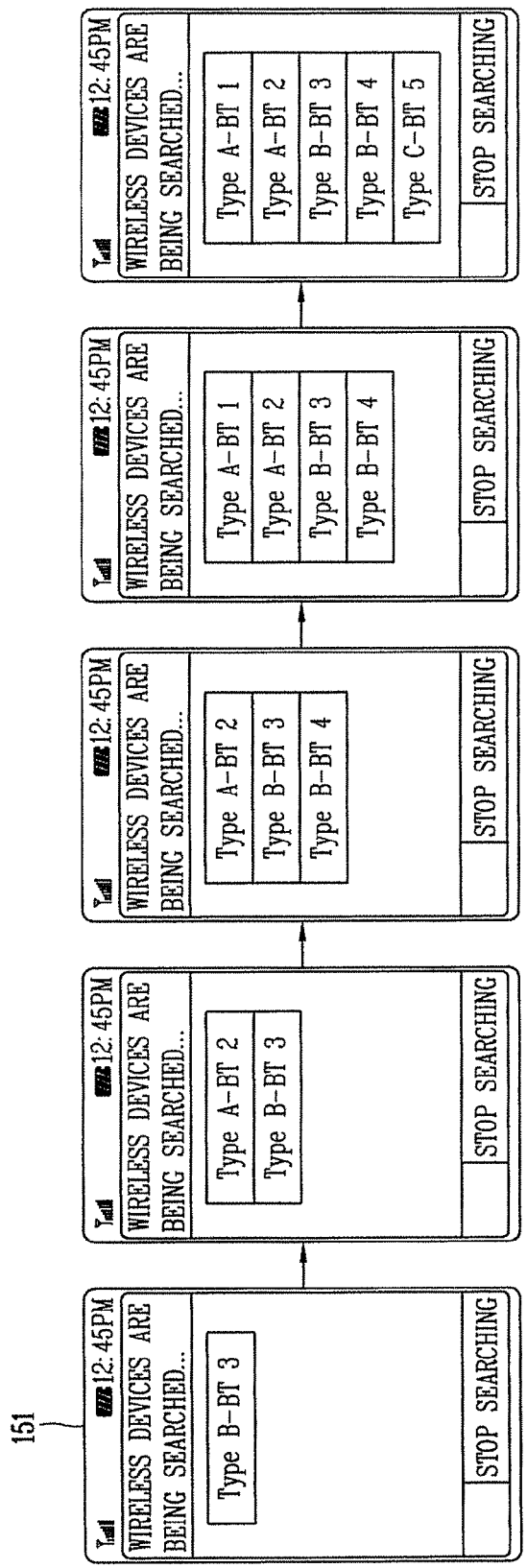

The search list showing the wireless devices in the order searched, but not based on the priority option is shown in FIG. 7A, and the search list showing the wireless devices based on the priority option, but not in the order searched is shown in FIG. 7B. For example, the wireless devices are searched in the order of 'BT3→BT2→BT4→BT1→BT5', as shown in FIG. 7A.

Referring to FIG. 7A, the first searched wireless terminal, 'BT3' is displayed at the lowest position of the search list, and the last searched wireless terminal, 'BT5' is displayed at the uppermost position in the search list. In contrast, referring to FIG. 7B, 'BT5' having the lowest priority is displayed in the lowest position in the search list and 'BT1' having the highest priority is displayed at the uppermost position in the search list.

The search list or pairing list may be represented as specific images, and the sizes of wireless devices are differently displayed according to their priority. Referring to FIG. 7C, in each step of searching a new wireless device, a specific image of a wireless device having the highest priority may be displayed by the largest size, being nearer to the center of a screen. The size and position of each wireless device may be changed whenever a wireless device having a higher priority is newly detected.

Figure 8:
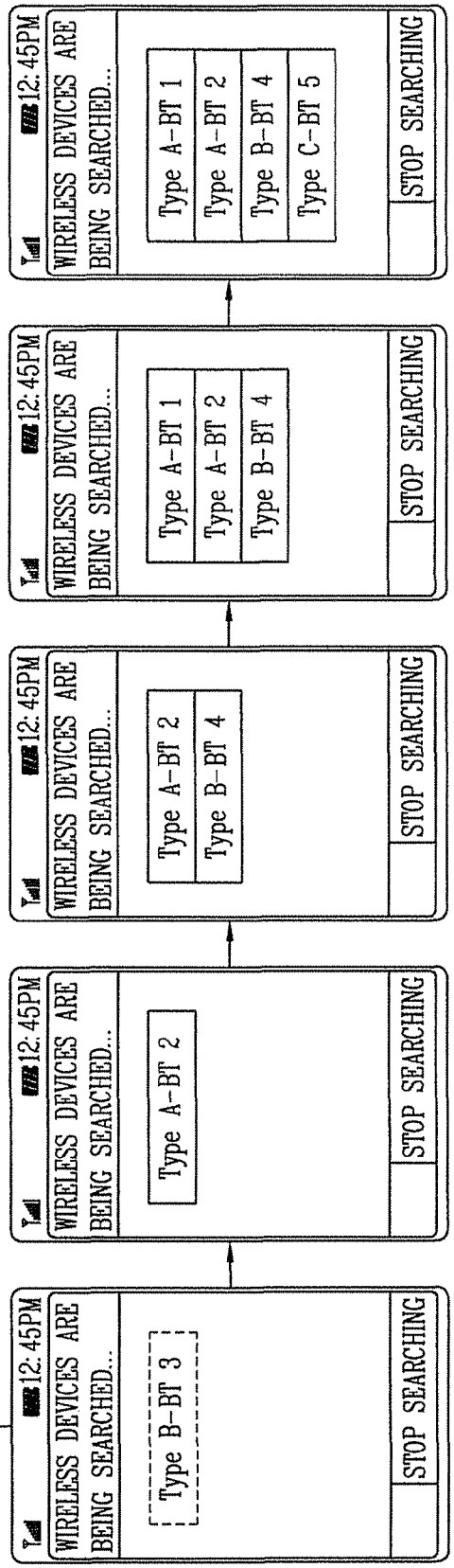
FIG. 8 is a view of a screen to illustrate a method for displaying wireless devices on a search list or a pairing list according to a priority option in a mobile terminal according to an embodiment of the present invention.

Referring to FIG. 8, a method for displaying a search list or pairing list by using specific images of wireless devices is described. As mentioned, the priority option may include a pairing frequency of a wireless device, an alphabetical order for a wireless device's name, the total time during which an wireless device is paired or accessed, a reception sensitivity for signals of a wireless device, distance of a wireless device, the type of a wireless device, and the type of a service that can be performed in the wireless device. The priority option may be used a plurality of times.

For example, 'BT1' and 'BT2' indicate headsets, 'BT3' and 'BT4' indicate mobile terminals, 'BT5' indicates a computer, and the priority option is set in the order of 'name→pairing frequency→types of wireless devices→search'. In this case, even though the 'BT5' was searched last and the 'BT3' was searched first, the 'BT1' was displayed at the uppermost position in the list according to a pairing frequency and the types of wireless devices, as shown in FIG. 8.

If the priority option is set to further include display of wireless devices that can perform specific services, such as voice communications, music output, and file transmission, when a wireless device that cannot perform the specific service, for example, 'BT3' is searched, the 'BT3' is not displayed in the search list, as shown in FIG. 8. The types of wireless devices may be distinguishable by icons or specific images, or taps or tags.

Figure 9A:
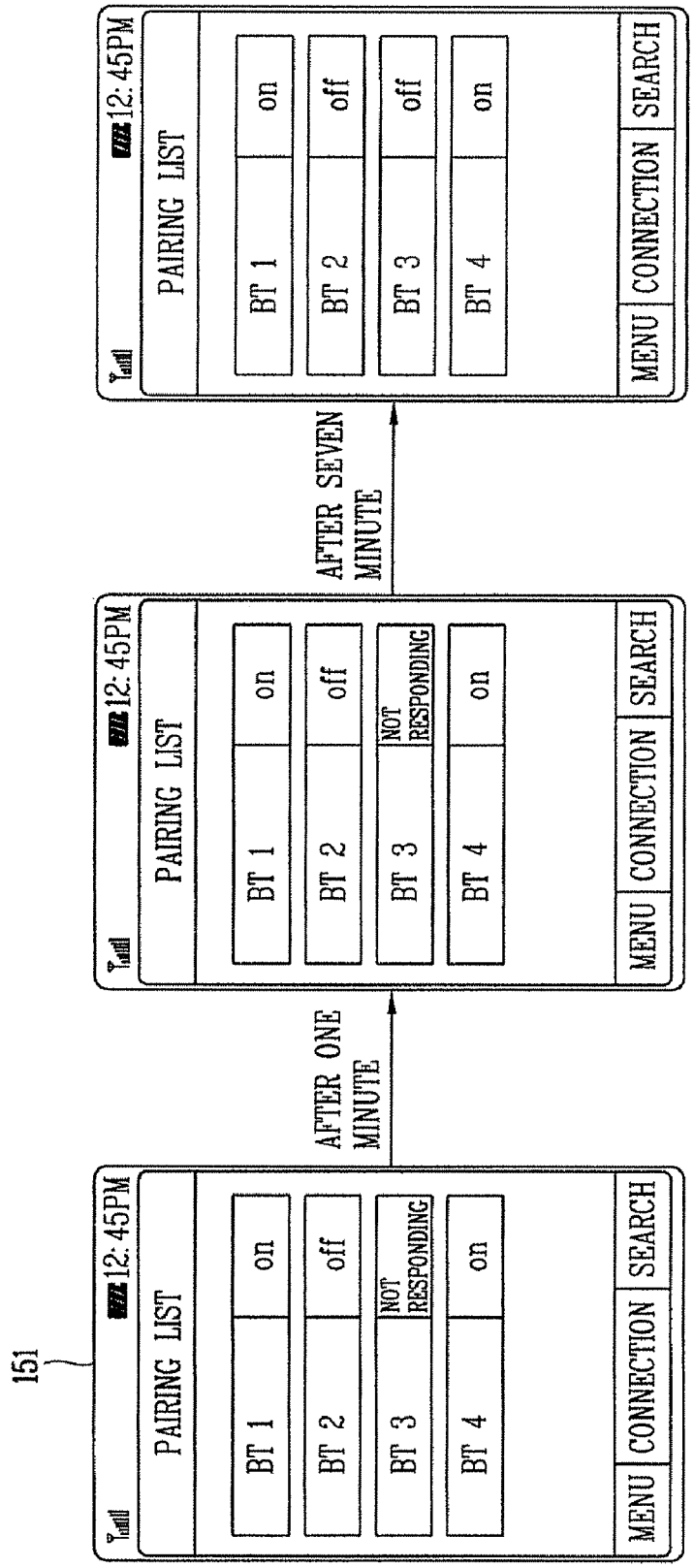
FIGS. 9A to 9C are views of a screen to illustrate a method for displaying a pairing list in a mobile terminal according to an embodiment of the present invention to indicate accessibility of each wireless device in real time.
Figure 9B:
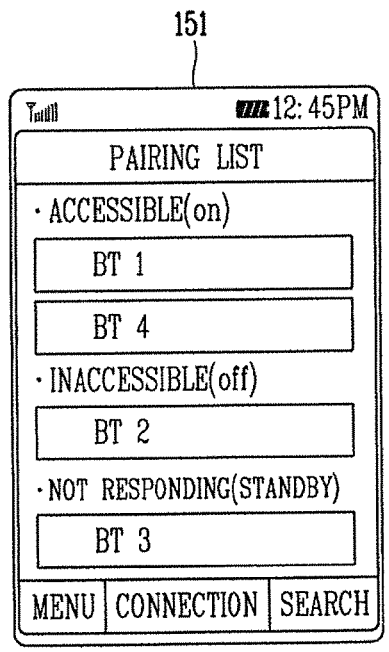
Figure 9C:
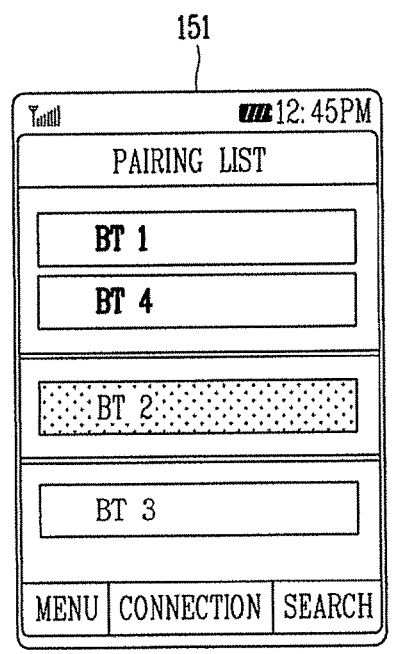
Figure 10:
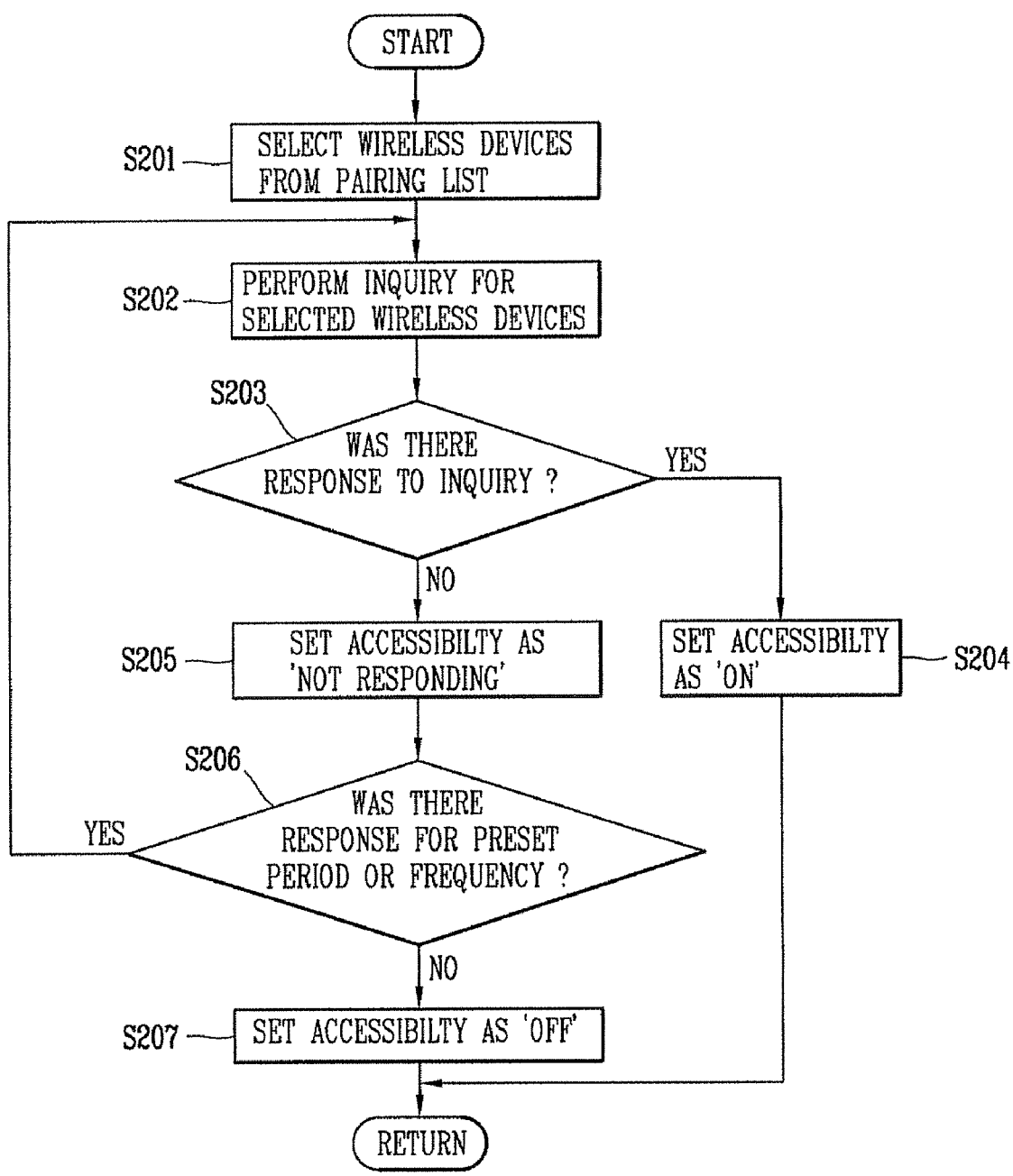
FIG. 10 is a flowchart showing a method for detecting and displaying a pairing list in a mobile terminal according to an embodiment of the present invention to indicate whether each wireless device is real time accessible.

FIGS. 9A to 9C are screen views of pairing lists, which show a method for displaying whether each wireless device is accessible in real time. FIG. 10 is a flowchart illustrating a method for detecting whether each wireless device is accessible in real time and displaying the accessibility of each wireless device.

When the mobile terminal 100 according to an embodiment of the present invention enters a wireless device connection mode, the controller 180 determines whether wireless devices registered to the pairing list are accessible by periodically performing inquiries. The frequency of inquiries may be arbitrarily set by the user. For example, if the frequency is set as one minute, wireless devices registered to the pairing list may be inquired every minute.

Regardless of the frequency of inquiries, conditions of a wireless device to be inquired may be set. For example, only wireless devices that are not accessible may be set to be inquired according to the preset frequency. The controller 180 may update accessibility information of wireless devices depending on whether wireless devices responded to the inquiry. If there was a response to the inquiry within a predetermined time, the controller 180 displays the accessibility of the responded wireless device as accessible. If there was no response to the inquiry within the predetermined time, the controller 180 displays the accessibility of the wireless device that did not respond to the inquiry as inaccessible.

The method for displaying accessibility of wireless devices are shown in FIGS. 9A to 9C. Referring to FIG. 9A, accessible and inaccessible wireless devices may be represented by using specific icons or texts, for example, On or Off, and displayed along with wireless device information according to an inquiry period. Referring to FIG. 9B, accessible and inaccessible wireless devices may be represented by using categories. Wireless devices not responding but being inquired may also be represented. Referring to FIG. 9C, accessible and inaccessible wireless devices may be displayed distinctly by using various colors, such as blue/red, fonts, such as large-sized Gothic/small-sized Italic, and brightness, such as clear/dark.

Referring to FIG. 10, when the pairing list is to be displayed or any preset period lapsed, the controller 180 selects one of a plurality of wireless devices registered to the pairing list and performs an inquiry (S201, S202). If a response to the inquiry is received, the controller 180 may set the accessibility as 'ON' (S203, S204).

However, if a response to the inquiry is not received, the controller 180 sets the accessibility as 'Not Responding' (S205) and continue to perform inquiries about other selected wireless devices. The inquiry is performed for all wireless devices registered to the pairing list.

Here, the process of inquires may be repeatedly performed for wireless devices which are in the 'Not Responding' state, or wireless devices which are in the 'OFF' accessibility, or one specific wireless device selected from all wireless devices by the user. If there was a response to the repeated inquiries, the accessibility may be set as 'ON' (S204). On the contrary, if there was no response for a preset frequency or preset period, the accessibility may be set as 'OFF' (S206, S207).

In the present invention, since each wireless device in the pairing list is displayed in real time with information regarding the accessibility, a user can perform a wireless connection by referring to the accessibility of the wireless device. Accordingly, unnecessary trials to connect to a wireless device which is in the 'OFF' accessibility can be prevented.

Figure 11:
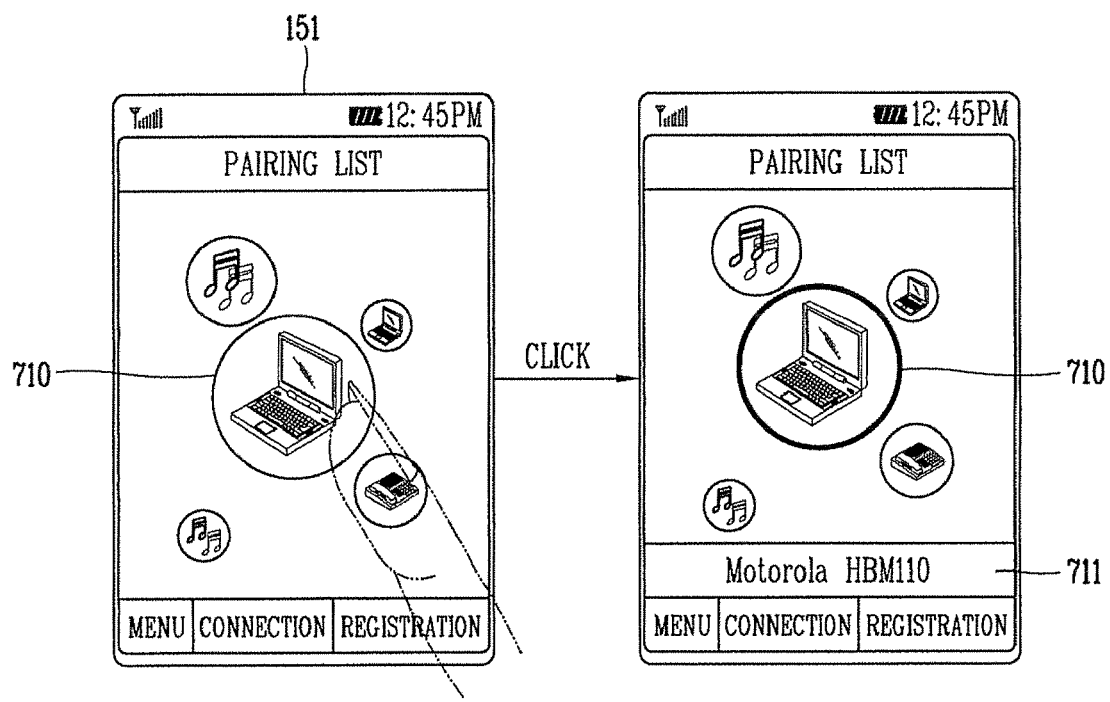
FIG. 11 is a view of a screen on a mobile terminal according to an embodiment of the present invention illustrating a method for selecting a wireless device displayed on a search list or a pairing list in a touch input manner.

The wireless devices displayed in a search list or pairing list may be selected in a touch manner. Referring to FIG. 11, when one of a plurality of wireless devices 710 displayed as a specific image in the search list or pairing list is selected in a button or touch input manner, the controller 180 displays information about the selected wireless device on a region 711 of the display 151.

A user determines registration or connection of wireless devices by referring to the information about the wireless devices displayed on the region 711 of the display 151. That is, once a specific image of a selected wireless device is double-clicked on a touch screen, or a certification button is input, the controller 180 registers the selected wireless device to the pairing list or wirelessly connects the selected wireless device to the mobile terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a wireless communication unit;
    a display unit; and
    a controller configured to:
        display on the display unit a search list including at least one wireless device that has not been registered to a pairing list of wireless devices previously paired with the mobile terminal in response to an input for activating a wireless device search mode according to a preconfigured priority option,
        wherein a wireless device in the search list having a higher priority in the preconfigured priority option is displayed larger in size and closer in proximity to a center of the display unit than the wireless device in the search list having a lower priority in the preconfigured priority option, and
        wherein the wireless device search mode is automatically triggered without activation input when there is no wireless device registered to the pairing list;
        register a selected one of the at least one wireless device upon selection from the search list to the pairing list;
        display on the display unit a newly aligned pairing list of wireless devices that includes the wireless device previously paired with the mobile terminal and the selected one of the at least one wireless device upon activation of a wireless connection mode,
        wherein the pairing list includes respective PIN codes or passwords of the wireless device and the at least one wireless device; and
        automatically connect a specific wireless device among the wireless devices in the newly aligned pairing list to the mobile terminal upon selection of the specific wireless device from the newly aligned pairing list.

2. The mobile terminal of claim 1, wherein the controller is further configured to display on the display unit a specific image for the at least one wireless device in the search list.

3. The mobile terminal of claim 1, wherein the controller is further configured to display on the display unit a name for the at least one wireless device in the search list.

4. The mobile terminal of claim 1, wherein the preconfigured priority option is based on at least a device number of pairing frequencies, an alphabetical device name order, recent access to device, a device access time, a device signal reception sensitivity, a device range, a device type, or a service capability of a device.

5. The mobile terminal of claim 1, wherein the selection from the search list to the pairing list is performed in response to a touch or button input.

6. The mobile terminal of claim 1, wherein the selection of the specific wireless device from the newly aligned pairing list is performed in response to a touch or button input.

7. A method of searching and pairing of at least one wireless device with a mobile terminal, the method comprising:
displaying on a display unit of the mobile terminal a search list including the at least one wireless device that has not been registered to a pairing list of wireless devices previously paired with the mobile terminal in response to an input for activating a wireless device search mode according to a preconfigured priority option,
wherein a wireless device in the search list having a higher priority in the preconfigured priority option is displayed larger and closer to a center of the display unit than the wireless device in the search list having a lower priority in the preconfigured priority option, and
wherein the wireless device search mode is automatically triggered sans the input for activating the wireless device search mode if there is no wireless device registered to the pairing list;
registering a selected one of the at least one wireless device upon selection from the search list to the pairing list;
displaying on the display unit of the mobile terminal a newly aligned pairing list of the wireless devices that comprises the wireless devices previously paired with the mobile terminal and the selected one of the at least one wireless device upon activation of a wireless connection mode,
wherein the pairing list comprises respective PIN codes or passwords of the wireless devices and the selected one of the at least one wireless device; and
automatically connecting a specific wireless device among the wireless devices in the newly aligned pairing list to the mobile terminal upon selection of the specific wireless device from the newly aligned pairing list.

8. The method of claim 7, wherein a name for each of the at least one wireless device in the search list is displayed on the display unit.

9. The method of claim 7, wherein a specific image for each of the at least one wireless device in the search list is displayed on the display unit.

10. The method of claim 7, wherein the preconfigured priority option is based on at least a device number of pairing frequencies, an alphabetical device name order, recent access to device, a device access time, a device signal reception sensitivity, a device range, a device type, or a service capability of device.

11. The method of claim 7, wherein the selection from the search list to the pairing list is performed in response to a touch or button input.

12. The method of claim 7, wherein the selection of the specific wireless device from the newly aligned pairing list is performed in response to a touch or button input.

* * * * *